(12) United States Patent
Catlin

(10) Patent No.: US 7,887,274 B2
(45) Date of Patent: Feb. 15, 2011

(54) INTERNALLY THREADED CONNECTOR

(76) Inventor: Bryan L. Catlin, 1754 Oak Orchard Rd., Albion, NY (US) 14411

( * ) Notice: Subject to any disclaimer, the term of this patent is extended or adjusted under 35 U.S.C. 154(b) by 218 days.

(21) Appl. No.: 12/224,171

(22) PCT Filed: Feb. 16, 2007

(86) PCT No.: PCT/US2007/004034
§ 371 (c)(1),
(2), (4) Date: Aug. 20, 2008

(87) PCT Pub. No.: WO2007/126478
PCT Pub. Date: Nov. 8, 2007

(65) Prior Publication Data
US 2009/0136320 A1 May 28, 2009

(51) Int. Cl.
*F16B 37/00* (2006.01)
(52) U.S. Cl. ............ 411/427; 411/436
(58) Field of Classification Search ............ 411/427, 411/436, 437
See application file for complete search history.

(56) References Cited
U.S. PATENT DOCUMENTS

| | | | | |
|---|---|---|---|---|
| 327,612 | A * | 10/1885 | Stark | 403/21 |
| 899,368 | A * | 9/1908 | Winter | 411/437 |
| 1,957,282 | A * | 5/1934 | Noyack | 411/427 |
| 2,278,320 | A * | 3/1942 | Kath | 403/44 |
| 2,552,794 | A | 5/1951 | Kimbell | |
| 2,632,355 | A * | 3/1953 | Becker | 411/427 |
| 3,637,244 | A * | 1/1972 | Strizki | 52/98 |
| 3,960,047 | A | 6/1976 | Liffick | |
| 4,165,904 | A * | 8/1979 | Reppert | 301/35.631 |
| 4,470,736 | A * | 9/1984 | Tasseron | 411/404 |
| 4,548,533 | A * | 10/1985 | Pratt | 411/55 |
| 4,708,397 | A | 11/1987 | Weinmann | |
| 6,568,145 | B2 * | 5/2003 | Bartel | 52/741.2 |
| 2002/0012578 | A1 | 1/2002 | Duran et al. | |
| 2005/0188636 | A1* | 9/2005 | Burns | 52/295 |

* cited by examiner

*Primary Examiner*—Gary Estremsky
(74) *Attorney, Agent, or Firm*—Richard C. Litman

(57) ABSTRACT

The internally threaded connector device (10a) is a thin-walled, internally threaded tube. A relatively short portion of the device includes a polygonal wrench gripping flange area. The device (10a) is installed on an existing short length of externally threaded stud (BS). Another length of externally threaded stud (12) is installed in the internally threaded connector (10a) so that the second externally threaded stud (12) extends beyond the face of a secured component, such as a flange (F). In an exemplary embodiment, a conventional nut (N) or the like is installed on the end of the second externally threaded stud (12) to secure a flange (F) and associated gasket (G) and pipe (P) to a manifold assembly (M).

10 Claims, 8 Drawing Sheets

INTERNALLY THREADED CONNECTOR

TECHNICAL FIELD

The present invention relates generally to threaded fasteners and connectors. More specifically, the present invention comprises various embodiments of an internally threaded connector having a thin-walled sleeve for fitting within a surrounding passage for use with or without a second stud and nut assembly.

BACKGROUND ART

The use of threaded fasteners and connectors is universal where high strength attachments are required and where disassembly may be required in the future without damage or deformation to the components. Nevertheless, such threaded fastener assemblies are prone to damage in certain environments where high temperatures, corrosive agents, and/or other harmful conditions may cause the fastener assembly to seize. A typical example of such a situation is often found in automobile engine exhaust systems, particularly at the exhaust manifold or manifold pipe where temperatures are at their highest in the system.

When this occurs, one or more of the externally threaded or male fastener components is often damaged or sheared off during disassembly. The relatively short length of externally threaded stud remaining is usually insufficient to provide for the attachment of a new nut or fastener thereto for reassembly when the thickness of the attached component is placed over the base structure. Accordingly, the traditional method of correcting the situation was to drill out the damaged, broken off stud, tap the newly drilled hole, and install another stud in the newly tapped hole. While this produces a repair that is just as strong and durable as the original installation, the labor involved is considerable, particularly if access is limited to the work area and if further disassembly is required for access.

A vast number of threaded connectors, both internal (female) and external (male) have been developed in the past. For example, the development of relatively long threaded rods for use in the construction industry has resulted in the development of internally threaded, elongate sleeves and the like for the assembly of two or more lengths of such rods. The problem with such internally threaded sleeves is that they are invariably excessively bulky due to the relatively thick wall construction and continuous hexagonal (or other shape) wrench flats, which extend for the entire length of the sleeve. While this results in relatively economical manufacture, the overall diameter of such a fastener precludes its use in an installation where it is located within a surrounding fastener clearance passage in order to provide for a secondary stud and nut assembly to be secured thereto where required.

Thus, an internally threaded connector solving the aforementioned problems is desired.

DISCLOSURE OF INVENTION

The disclosure is directed to an internally threaded connector. The connector has a generally tubular cylindrical sleeve. The sleeve has a thin wall and is internally threaded along at least a portion of its length. The each end of the sleeve each has a flat bearing surface. A plurality of wrench flats are disposed in a polygonal circumferential array about a minor portion of the sleeve.

The disclosure is also directed to a method of securing an attachment component to a base component with a broken externally threaded fastener extending therefrom using the internally threaded connector of the present invention. In accordance with the method, an internally threaded connector is first installed upon the broken externally threaded fastener. A threaded replacement stud is then installed in the internally threaded connector and the attachment component is placed upon the base component with the internally threaded connector disposed within a clearance passage of the attachment component so that the threaded replacement stud extends beyond the attachment component. An internally threaded fastener is then installed upon the threaded replacement stud in order to secure the attachment component to the base component.

BRIEF DESCRIPTION OF THE DRAWINGS

Similar reference characters denote corresponding features consistently throughout the attached drawings.

BEST MODES FOR CARRYING OUT THE INVENTION

Figure 1:
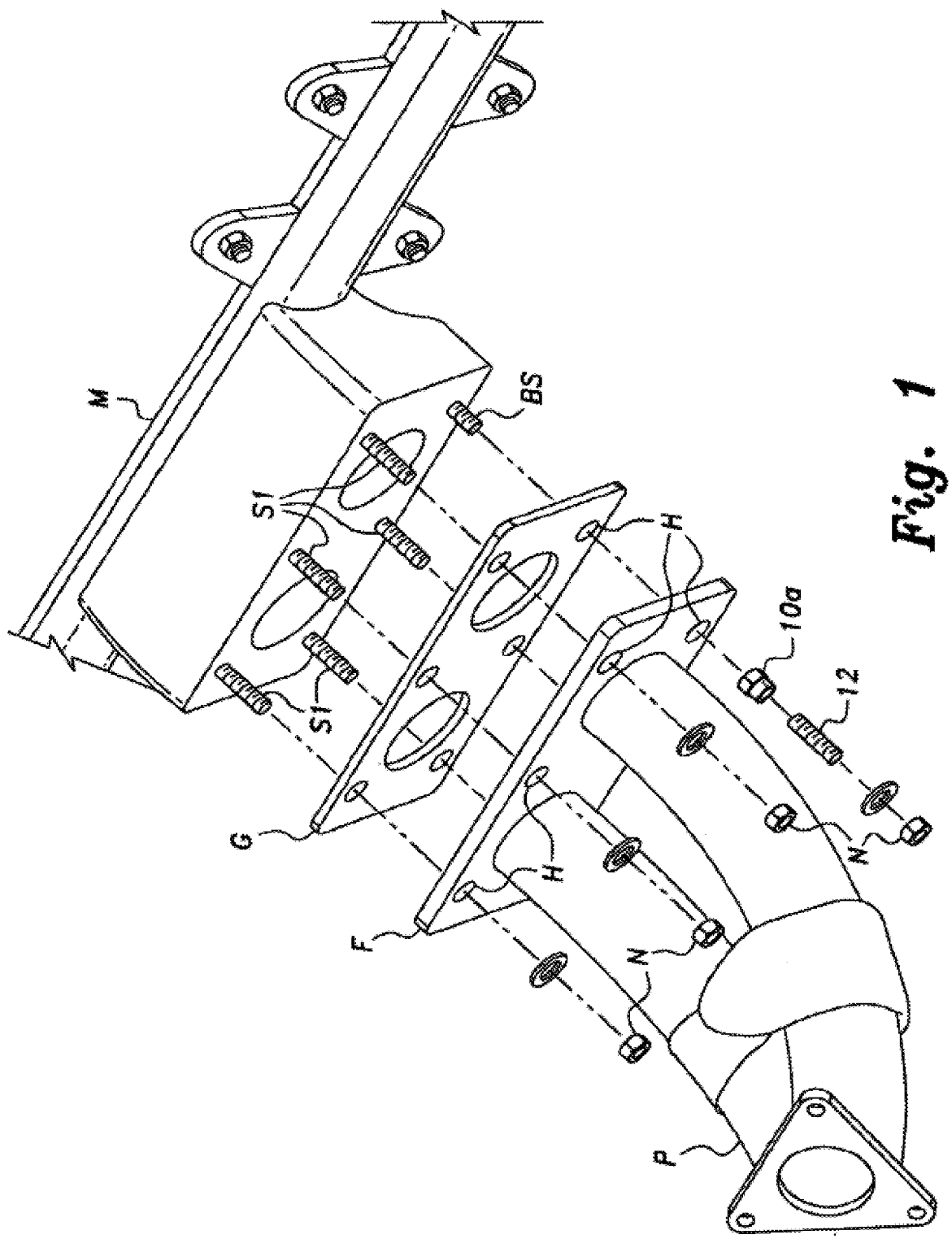
FIG. 1 is an exploded environmental perspective view of a first embodiment of an internally threaded connector according to the present invention, showing its installation on an exhaust manifold.

The internally threaded connector comprises a series of embodiments providing for the assembly or reassembly of two relatively short, externally threaded studs or the like into a single longer component. This, in turn, provides sufficient length to the externally threaded assembly for use in assembling or reassembling two or more components normally secured together by means of threaded fasteners. Alternatively, some embodiments of the device may be used alone without need for an additional stud and nut assembly under some circumstances. The internally threaded connectors all include a relatively thin-walled sleeve, thereby reducing the external diameter to fit within the fastener clearance passage of the attaching component. A relatively narrow diameter polygonal wrench flange portion is provided in certain embodiments, with the narrow diameter of the wrench flange portion providing clearance from the surrounding passage of the attaching component. Embodiments with larger diameter wrench flange portions may be used without need for a second stud and nut assembly under some conditions, with the larger diameter wrench flange portion being positioned externally to the assembly to clamp the assembly together as in a conventional bolt head or nut. The wrench flange portion may be located at or near one end of the device, or generally medially along the device, as required.

The internally threaded connector is adaptable for use in a wide variety of different installations, but is particularly well suited for the repair of broken threaded studs in automotive engine exhaust systems. Generally, the broken stud extends from the base material (e.g., cylinder head) for a short distance sufficient to provide a grip length for the installation of one of the internally threaded connectors thereon. The broken end of the stud is "cleaned up" by removing any deformed threads and material, and one of the internally threaded connectors is installed thereon. A second externally threaded stud is then threaded into the internally threaded connector to provide sufficient total stud length for the attachment of the component to the base structure. In some instances sufficient original stud length may remain to allow some embodiments of the present fastener to be installed without need for a second stud and nut assembly. As exhaust systems are subject to high temperatures, the fastener clearance passages of the attached component (e.g., exhaust manifold) are generally relatively large in order to provide clearance for the threaded studs to allow for thermal expansion and contraction. The relatively thin wall of the internally threaded connector fits within the fastener clearance passage of the attached component, with the additional stud providing sufficient grip length beyond the installed component for the installation of a conventional nut thereto where necessary.

Alternatively, the internally threaded fastener may be used to top off an existing threaded male stud or rod, to provide a receptacle for the attachment of a decorative male-threaded attachment, e.g., atop a carburetor air cleaner or the like. Rather than threading a length of externally threaded stud into the device to extend the length, the device may be used as an internally threaded receptacle for a conventional headed bolt, machine screw, or the like. Alternatively, the head of the bolt may be removed to form an externally threaded stud for use with the internally threaded connector.

FIG. 1 of the drawings illustrates an exemplary installation of an internally threaded connector according to the present invention in an engine exhaust system. The exhaust system includes a conventional exhaust manifold M to which an exhaust pipe P (e.g., "Y" pipe, etc.) is bolted by means of its flange F, which installs over a series of threaded studs S1 that extend from the exhaust manifold M. A gasket G is installed between the exhaust pipe flange F and the manifold M. This system is conventional, but the extremely hot environment tends to accelerate corrosion of the metal components, often causing the threads of the attachment nuts N to seize on the exhaust manifold studs S1. This often leads to the stud S1 being sheared off when the nut N is removed therefrom, resulting in a shortened, broken stud BS when the exhaust system is disassembled. Conventionally, the broken stud BS is cut off and drilled out of its installation in the exhaust manifold M, the hole is tapped, and a new stud is threaded into the newly tapped hole. While this process results in a repair that is at least equal in strength and durability to the original structure, it is quite labor intensive and may require additional labor for disassembly of componentry in order to provide room for access to the area of the broken stud by drills, taps, etc.

The internally threaded connector of the present invention provides a solution to this problem by means of a relatively short, internally threaded connector 10a, which is installed upon the relatively short broken stud BS, with a new stud 12 being threaded into the opposite end of the connector 10a from the broken stud attachment end. This process is shown generally in FIG. 1 of the drawings. The connector 10a has a relatively thin wall and closely conforming wrench flats (shown more clearly in other drawings and discussed in greater detail further below) in order that the wrench flats will pass through the stud passage or hole H of the exhaust system flange F. Generally, exhaust systems are provided with relatively large diameter clearance holes or passages H for attachment studs S1 and the like, due to the high temperatures normally seen in such systems. The relatively large clearance holes H allow for thermal expansion between components as they change from ambient temperature to operating temperature and back. Otherwise, the passage or hole H of the exhaust flange F and/or gasket G may be enlarged easily while those components are removed from the engine, if necessary. The only other step that may be necessary in this method or procedure is that of "cleaning up" or removing any damaged area from the distal end of the broken stud BS so that the attachment component 10a will thread cleanly onto the broken stud BS. This may be easily accomplished with a die grinder or other small power tool, and generally does not require further disassembly of the structure.

Figure 2:
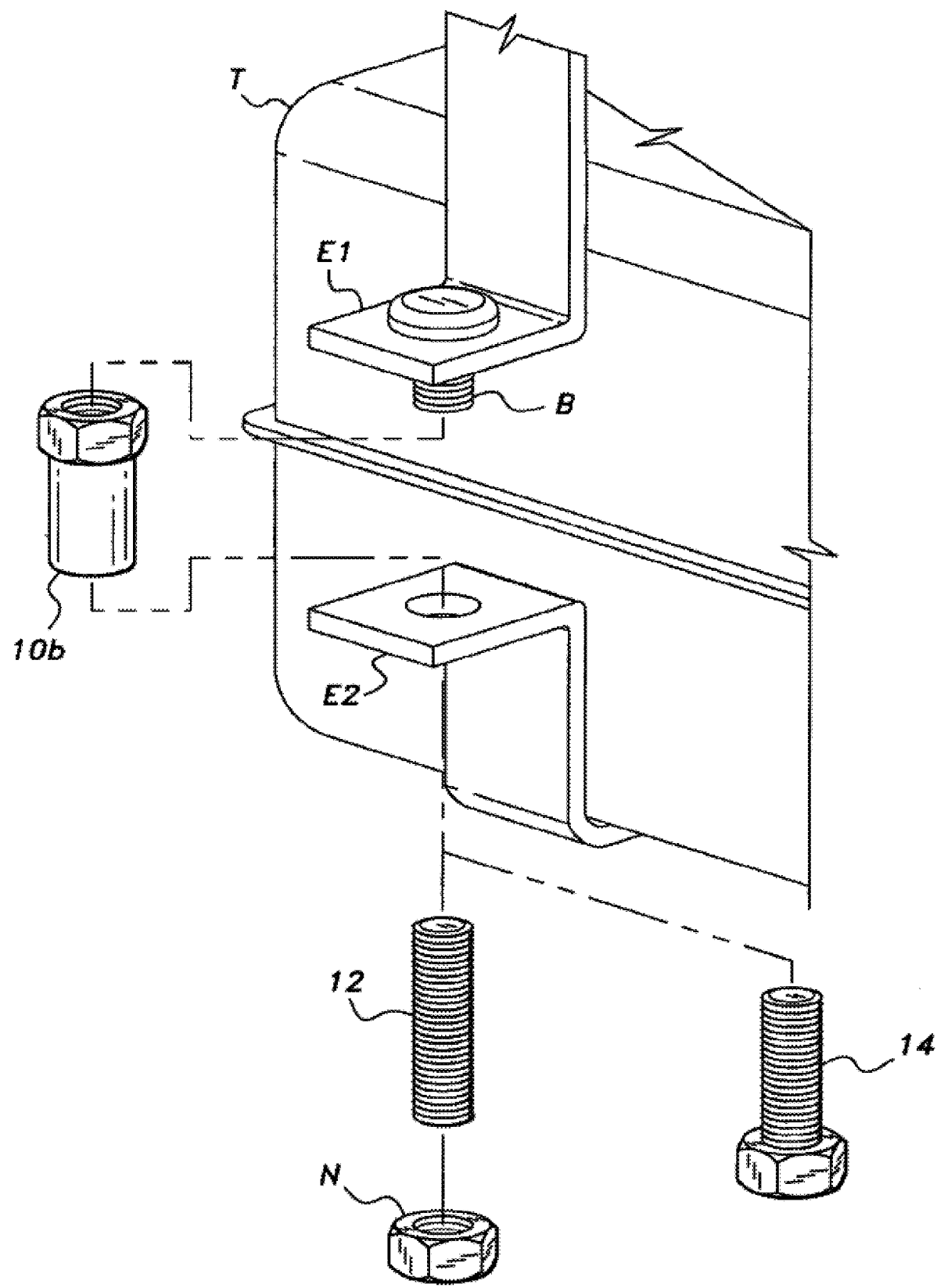
FIG. 2 is an exploded environmental perspective view of a second embodiment of an internally threaded connector according to the present invention having a greater shank length for assembly of spaced apart components.

FIG. 2 provides an illustration of another exemplary installation of an alternative embodiment 10b of the internally threaded connector. The connector 10b is somewhat longer than the connector 10a of FIG. 1, for use in providing a longer reach where required. FIG. 2 illustrates a fuel tank or container installation, where the typical bolt B extending from one mounting strap ear E1 has been broken off. Such breakage due to corrosion is reasonably well known in motor vehicles, as fuel tanks are typically installed beneath the vehicle where they are subject to contamination by road salt, moisture, etc. The internally threaded connector 10b provides a means of repairing the problem. The threaded end of the broken bolt B is cleaned up to allow the connector 10b to be threaded smoothly thereon. A replacement stud length 12 is then inserted through the lower strap lug or ear E2 and threaded into the connector 10b, with a nut N secured to the replacement stud 12 to secure the assembly. Alternatively, a new bolt 14 may be installed through the tank strap ear E2 and threaded into the connector 10b, if desired. It will be seen that the head may be cut from the bolt 14 to form a stud of required length, if so desired.

Figure 3:
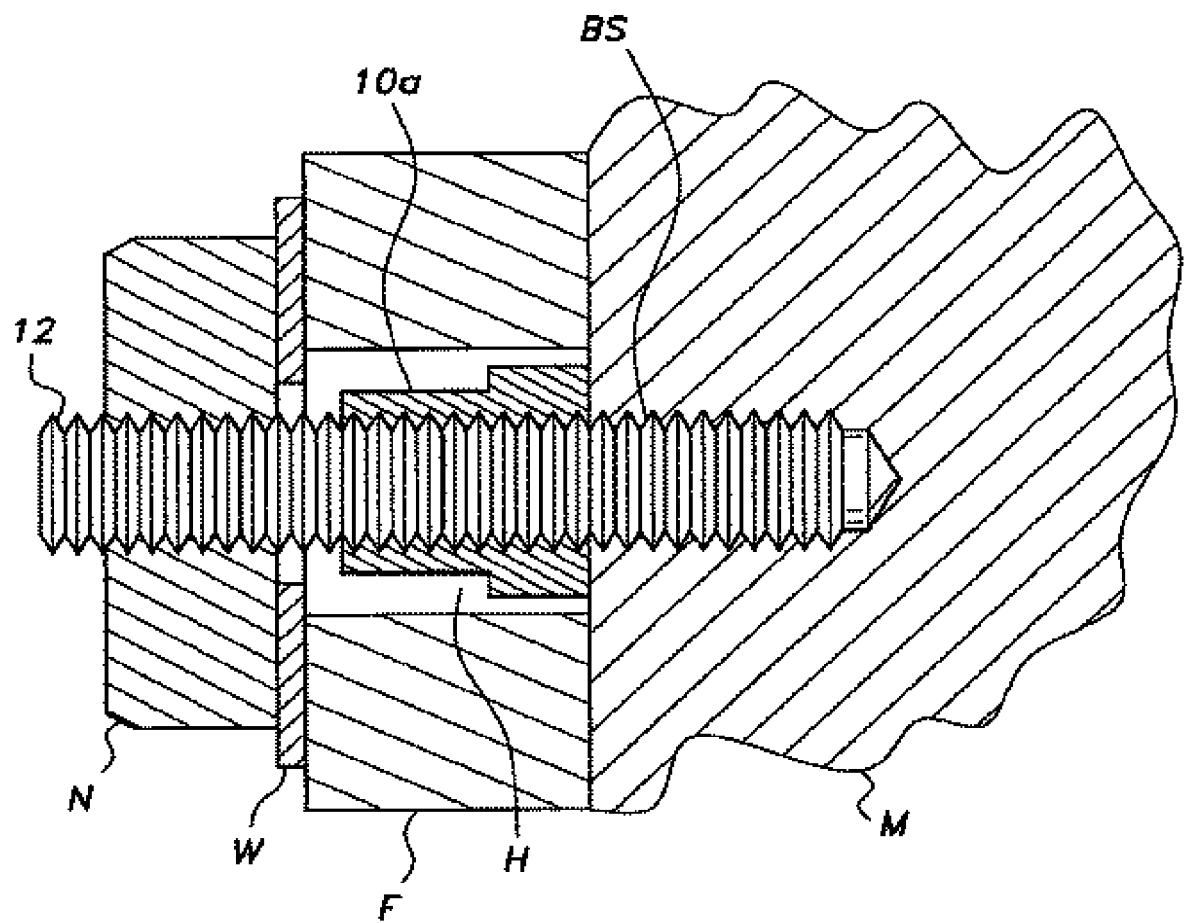
FIG. 3 is a detailed side elevation view in section of the internally threaded connector embodiment of FIG. 1, showing details of an exemplary installation.

FIG. 3 provides a detailed side view in section of an exemplary completed installation of the internally threaded connector, e.g., the relatively short connector 10a used in the exhaust system repair shown in the exploded view of FIG. 1. (The gasket of FIG. 1 is not shown in FIG. 3, in order to simplify the drawing of FIG. 3.) The relatively narrow span or diameter of the hexagonal wrench flat area of the fastener 10b is shown in the sectional view of FIG. 3, with the wrench flats fitting completely within the larger passage or hole H of the exhaust pipe flange F. This allows the fastener 10b to seat directly upon the manifold M (or other base structure) and grip any protruding threads extending from a broken stud BS. The relatively short length of the fastener 10a assures that it does not extend beyond the outer face of the flange F, so that the washer W and nut N seat directly upon the exhaust system flange F to clamp the flange F tightly against the manifold M.

Figure 4:
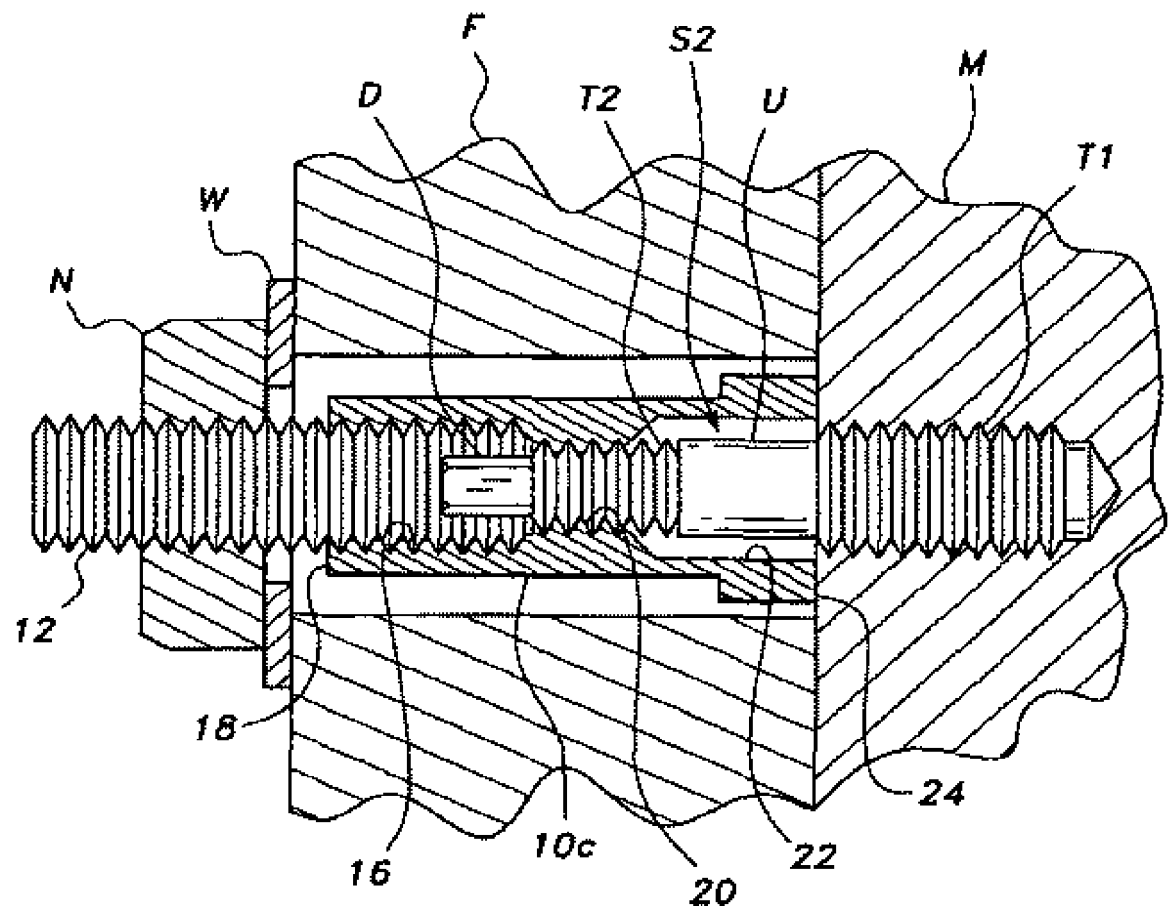
FIG. 4 is another detailed side elevation view of the internally threaded connector embodiment of FIG. 2, showing details of another installation.

FIG. 4 provides a side elevation view in section of another alternative embodiment 10c of the internally threaded connector. The connector 10c of FIG. 4 is configured for installation over a partially threaded stud S2, as is commonly used with General Motors type exhaust systems and the like. Such studs S2 are generally provided with an unthreaded portion U which extends outwardly beyond the larger diameter base component attachment threads T1, with a smaller diameter threaded portion or length T2 extending therebeyond. A distal hexagonal drive end D extends beyond the smaller diameter threaded portion T2, and is used with a hexagonal drive socket to thread the stud S2 into the base material M.

Accordingly, the internally threaded connector 10c of FIG. 4 includes a relatively larger diameter internally threaded first portion 16 adjacent the first end 18 thereof for accepting the new replacement stud 12 therein. The replacement stud 12 may be of the same diameter and thread pitch as the larger diameter threaded portion T1 of the stud S2, or of some other diameter and pitch, as desired. The central or medial portion of the connector 10c includes a somewhat smaller diameter internally threaded second portion 20, configured to thread onto the smaller diameter threaded portion T2 of the stud S2. Finally, an internally smooth and unthreaded portion 22 is provided adjacent the second end 24 of the fastener sleeve 10c, with the unthreaded portion 22 having a larger internal diameter than the first internally threaded portion 16 adjacent the opposite first end 18 of the device. This relatively larger internally unthreaded portion 22 provides clearance over the unthreaded portion U of the stud S2.

The internally threaded connector 10c is used generally in the same manner as that described further above for the connectors 10a and 10b, i.e., by threading the device onto the stud S2 and then threading a new replacement extension stud 12 into the device 10c. The attachment component, e.g., flange F or other component is then placed upon the base component M with the replacement stud 12 extending through the passage or hole H of the attachment component F. A nut N (and generally also a washer W) is then secured to the extended end of the replacement stud 12 to clamp the attachment component F to the base component M, generally in the manner described further above for other embodiments.

Figure 5A:
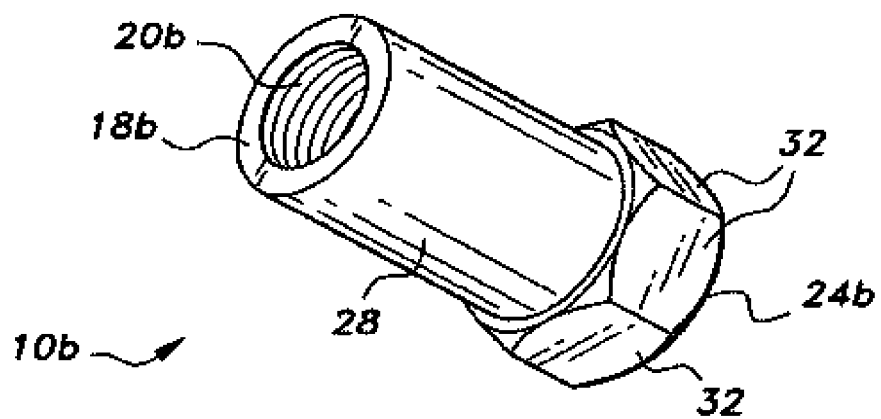
FIG. 5A is a detailed perspective view of the internally threaded connector embodiment of FIGS. 2 and 4, showing further details thereof.
Figure 5B:
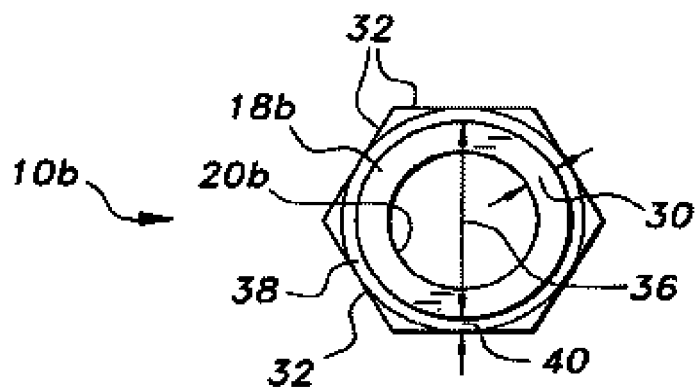
FIG. 5B is an end elevation view of the connector of FIGS. 2, 4, and 5A.
Figure 5C:
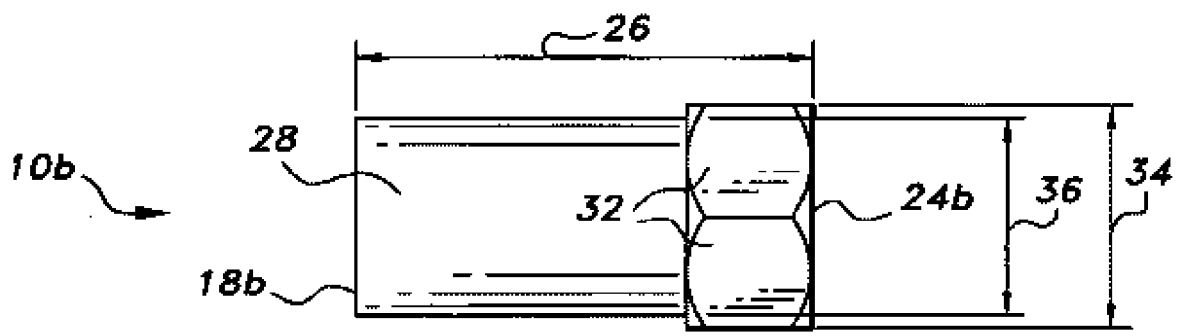
FIG. 5C is a side elevation view of the connector of FIGS. 2, 4, 5A, and 5B.

FIGS. 5A through 5C, respectively, provide detailed perspective, end, and side elevation views of an elongate internally threaded connector, such as the connector 10b of FIG. 2. The connector 10b comprises a relatively elongate cylindrical tubular sleeve having a first end 18b and an opposite second end 24b, with the two ends defining the length 26 of the device. Each end is machined or otherwise formed to have a bearing surface flat thereon, as shown in FIGS. 5A and 5B for the first end 18b. This provides a greater bearing surface area, and therefore greater compressive strength for the relatively thin wall of the device 10b than would a rounded or other non-flat edge configuration. The threaded internal surface 20b of the sleeve has a constant diameter and thread pitch in order to accept an existing broken stud in one end and a replacement extension stud of the same diameter and pitch in the opposite end. However, it should be noted that the threaded internal surface need not extend the entire length of the device 10b, but may comprise only a portion of the internal surface of the device, somewhat in the manner of the internally threaded connector 10c of FIG. 4. The external surface 28 of the sleeve 10b, along with the threaded internal surface 20b, define a thin wall having a relatively narrow thickness 30 between the two surfaces in order to provide clearance from the wall of any surrounding hole or passage of a structure installed thereon. The wall thickness is exaggerated in the end view of FIG. 5B for clarity in the drawing.

A plurality of wrench flats 32 is disposed in a polygonal circumferential array about a minor portion (i.e., significantly less than half the length) of the external surface 28 of the device. The wrench flats 32 may be disposed adjacent one end of the device, e.g., the second end 24b in the case of the device 10b, or generally medially about the device in the case of the embodiments of FIGS. 7 and 8, discussed further below. In the case of the embodiment 10b and others in which the device must fit within a relatively narrow hole or passage, the wrench flats 32 define a diameter 34 only very slightly larger than the exterior of the device. The mutually opposed flats 32 define a minor diameter 34, as shown in the side view of FIG. 5C, with the difference between the minor diameter 34 of the wrench flats 30 and the diameter 36 of the exterior surface 28 defining a narrow bearing surface land 38. The circular outer edge of the bearing surface land 38 is defined by the minor diameter 34 of the wrench flats 32, while the inner edge of the bearing surface land 38 is defined by the diameter 36 of the exterior surface 26 of the sleeve 10b. The width 40 of the bearing surface land 38 is no greater than, and most preferably somewhat less than, the thickness 30 of the sleeve wall in order to reduce the overall diameter of the device 10b and its wrench flats 32 to the minimum practicable in order to fit within any surrounding holes or passages.

Figure 6:
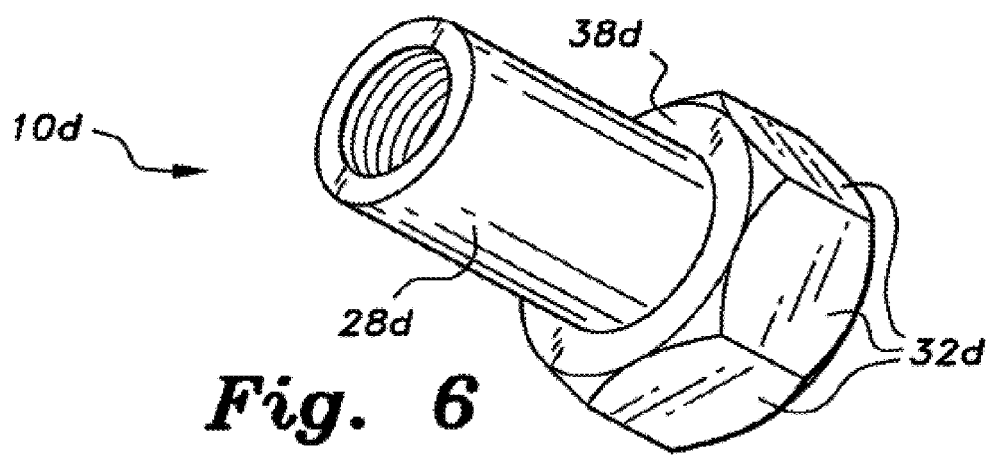
FIG. 6 is a detailed perspective view of an alternative embodiment of an internally threaded connector according to the present invention having a relatively wide wrench flange extending therefrom.
Figure 7:
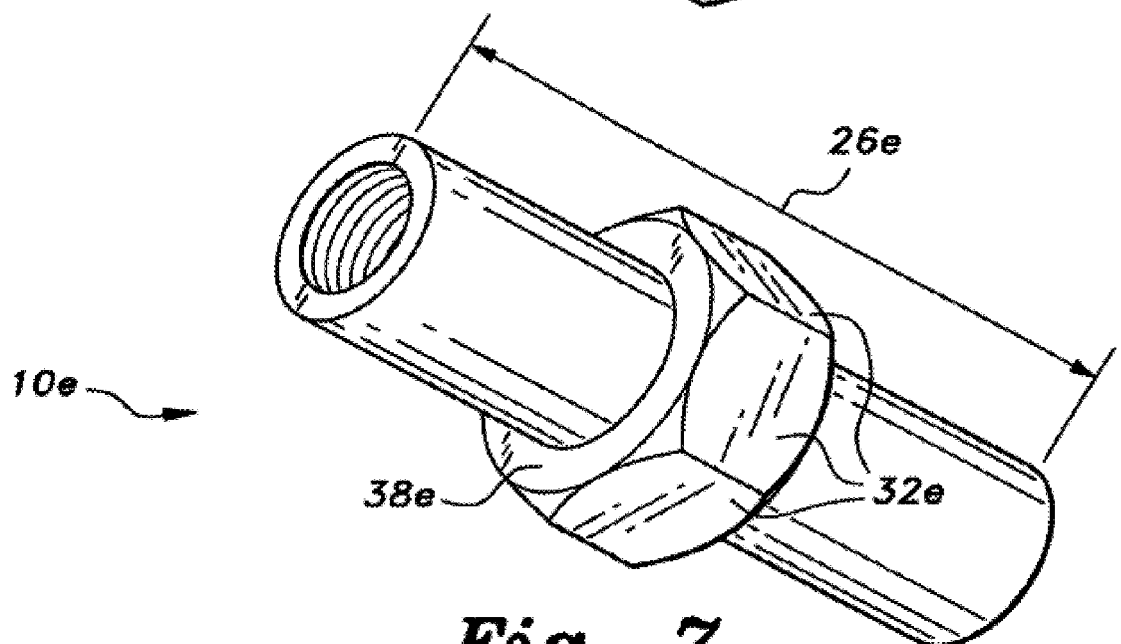
FIG. 7 is a detailed perspective view of another alternative embodiment of an internally threaded connector according to the present invention having a relatively wide, medially disposed wrench flange.
Figure 8:
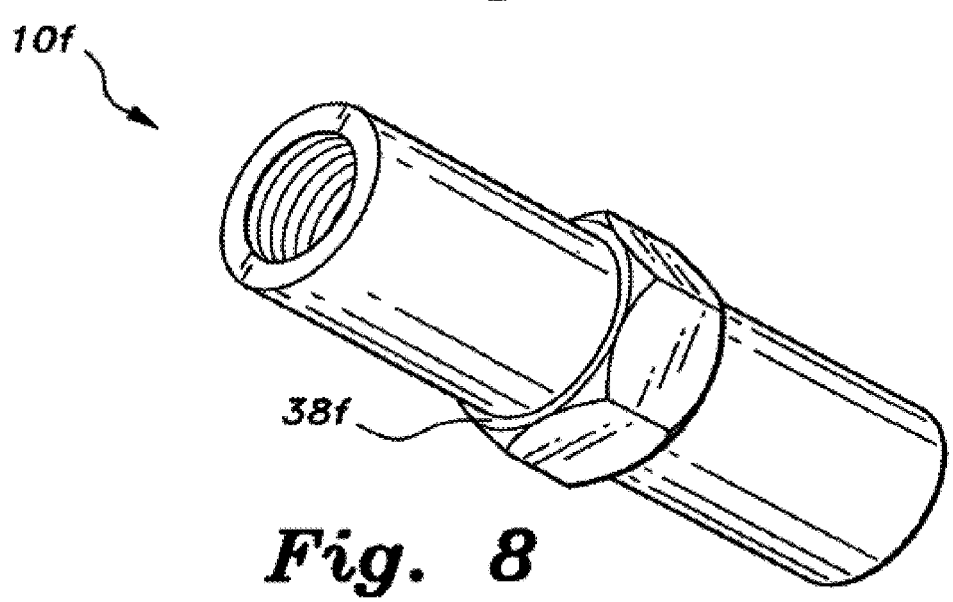
FIG. 8 is a detailed perspective view of yet another alternative embodiment of an internally threaded connector according to the present invention having a relatively narrow, medially disposed wrench flange.

FIGS. 6 through 8 provide perspective views of additional embodiments of an internally threaded connector according to the present invention. The embodiment 10d of FIG. 6 will be seen to be quite similar to the embodiment 10b of FIGS. 5A through 5C, with the exception of the diameter of the wrench flats 32d relative to the diameter of the external surface 28d of the device. The relatively larger minor diameter of the wrench flats 32d in the sleeve or fastener embodiment 10d defines a relatively larger width bearing surface land 38d in comparison to the sleeve or fastener embodiment 10c of FIGS. 5A through 5C. The fastener embodiment 10d of FIG. 6 is thus more suited for installation where the attached component does not have a closely surrounding attachment hole or passage that would interfere with the larger diameter wrench flats 32d.

FIG. 7 provides an illustration of still another embodiment 10e of an internally threaded connector in which the relatively large diameter wrench flats 32e are disposed generally medially along the length 26e of the device. It will be appreciated that the wrench flat area of the connector embodiment 10e of FIG. 7 could be narrowed to provide a bearing surface land 38e of about the same proportions as the land 38b of the fastener sleeve 10b of FIGS. 5A through 5C, if so desired. As in the case of the internally threaded connector 10c of FIG. 4, the connector 10e may be provided with a constant diameter and thread pitch throughout its length, or different thread diameters and pitches may be used in either end of the device. The internally threaded connector 10f of FIG. 8 illustrates such a medially disposed wrench flat embodiment having a relatively narrow bearing surface land 38f. It will be appreciated that other embodiments having minor variations upon the themes or embodiments shown and described herein may be formed from the various embodiments described and illustrated.

Figure 9:
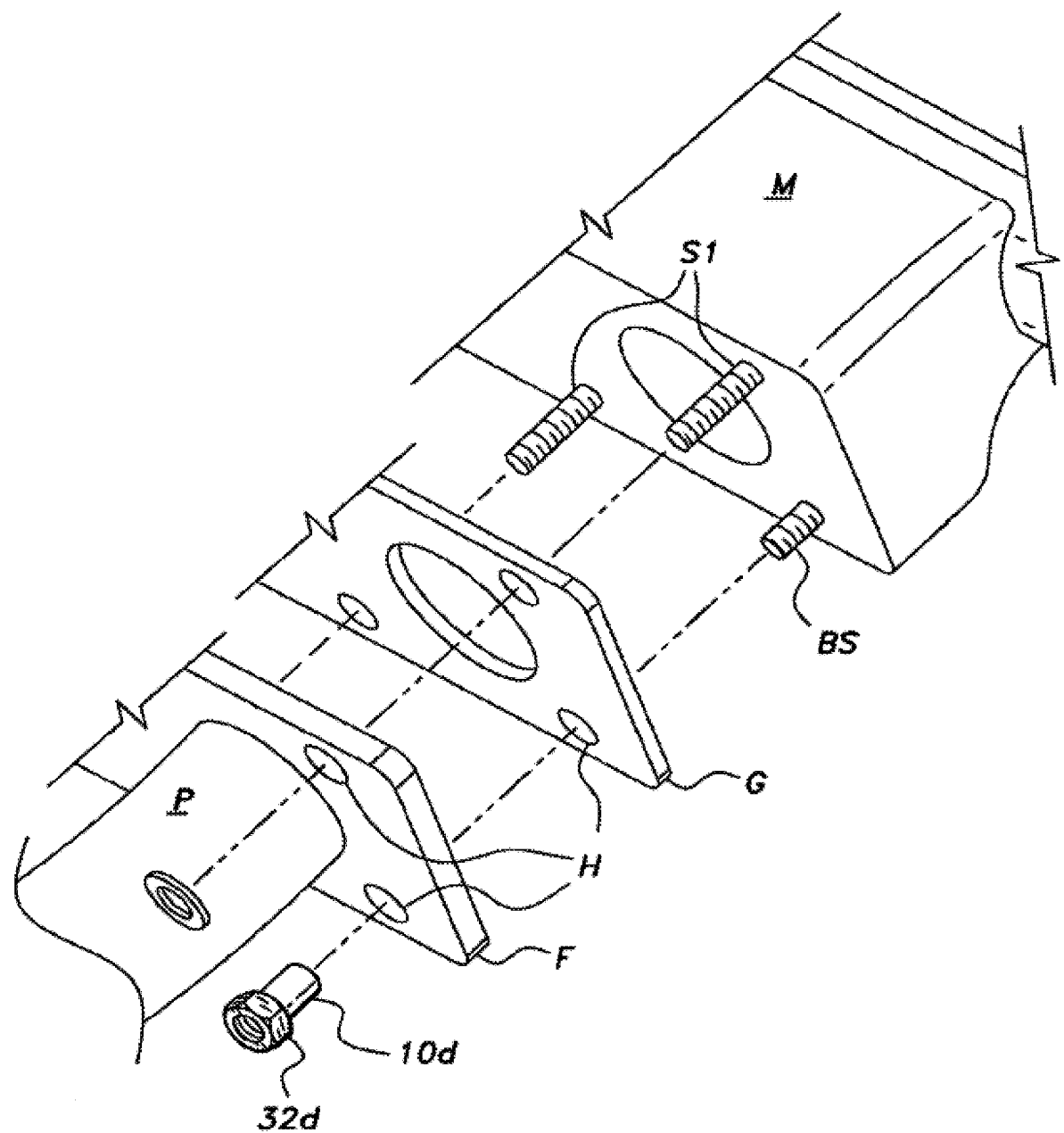
FIG. 9 is an exploded environmental perspective view similar to FIG. 1, but showing an alternative embodiment of an internally threaded connector according to the present invention having a large diameter wrench flat area serving the function of a bolt head or nut.

FIG. 9 of the drawings provides an exploded perspective view of a portion of an exhaust system assembly, similar to the view of FIG. 1. However, rather than using the relatively short fastener 10a and secondary stud 12 and nut N assembly of FIG. 1, the longer internally threaded fastener 10d, shown in detail in FIG. 6, is used. The fastener 10d is turned around from the orientation of the fastener 10a of FIG. 1, i.e., the fastener 10d has its wrench flat portion 32d disposed externally to the exhaust pipe flange F in FIG. 9. As the head or wrench flat portion 32d of the fastener 10d is of relatively large diameter relative to the diameter of the cylindrical sleeve or barrel portion, the wrench flat portion 32d extends beyond the diameter of the clearance hole or passage H formed through the flange F. Thus, by turning the fastener 10d around as shown in FIG. 9 with its wrench flat head portion 32d disposed externally to the exhaust system flange F, the larger diameter wrench flat portion 32d bears against the flange F when the internally threaded fastener 10d is threaded onto the broken stud BS by means of the narrower diameter sleeve portion which passes through the clearance hole H of the exhaust system flange F. This configuration precludes need for the additional secondary external replacement stud and nut assembly, as used in the fastener embodiment and assembly of FIG. 1.

Figure 10:
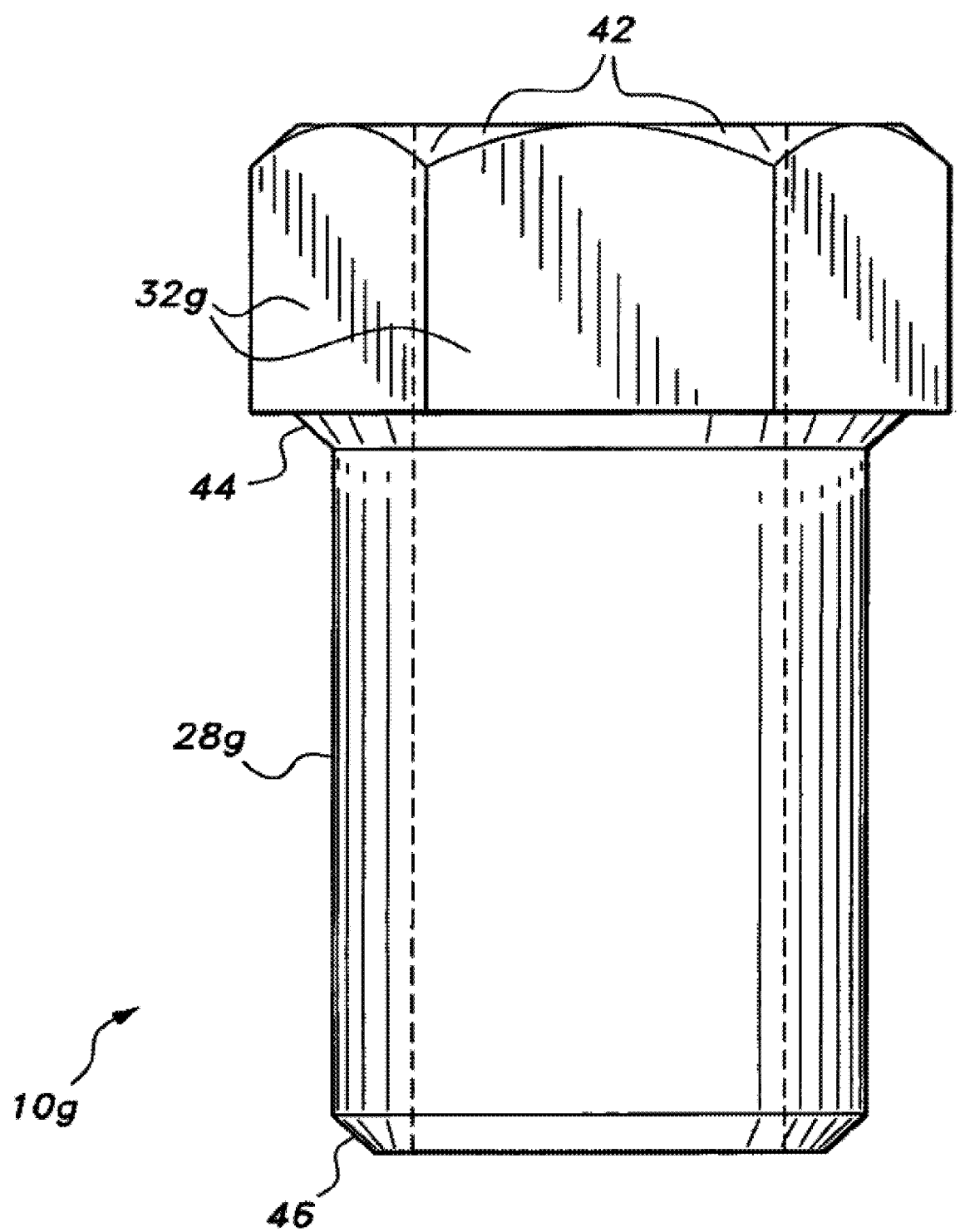
FIG. 10 is an enlarged side elevation view of an alternative embodiment of an internally threaded connector according to the present invention similar to the embodiment of FIGS. 2 and 5A through 5C, but incorporating a beveled crown edge at the hexagonal wrench flange portion and a beveled fillet beneath the shoulder portion of the connector.

FIG. 10 of the drawings provides a side elevation view of still another alternative embodiment, designated as internally threaded fastener 10g. The fastener 10g is externally similar to the fastener 10d of FIGS. 6 and 9, having a relatively large diameter wrench flat portion 32g relative to the diameter of the cylindrical sleeve or barrel portion 28g, and disposed at or adjacent to one end of the device. However, the internally threaded fastener 10g of FIG. 10 includes a series of beveled edges and/or fillets thereon, facilitating the installation and/or fitting of a wrench thereon and/or increasing the strength of the device.

A beveled crown edge 42 is provided along the upper and outer edge of the wrench flat portion 32g, i.e., that edge 42 being opposite the cylindrical sleeve portion 28g of the fastener. This beveled crown 42 will be seen to be similar to bevels shown along equivalent areas of the fasteners 10b, 10d, 10e, and 10f, and in fact any of the fasteners of the present invention may incorporate such a crown bevel along either or both edges of the wrench flat portion thereof, if so desired.

The fastener 10g of FIG. 10 further includes a beveled fillet 44 about the sleeve portion 28g, adjacent the wider diameter wrench flat portion 32g. This provides a stronger fastener 10g, and avoids a stress riser, which would exist if the juncture of the sleeve and wrench flat portions of the fastener formed a sharp right angle.

Finally, the fastener 10g includes a beveled edge 46 disposed about the lower end of the sleeve portion 28g, i.e., the end opposite the circumferential array of wrench flats 32g. It will be seen that any or all of these various bevels and fillets may be incorporated in any of the various embodiments of the internally threaded connector as practicable, including a symmetrical disposition of the bevels and fillets on those connector embodiments where the wrench flat portion is positioned along the cylindrical sleeve at some location other than at one end thereof.

In conclusion, the internally threaded connector in its various embodiments greatly facilitates the repair of broken threaded studs and similar threaded components. While it is envisioned that one of the primary uses for the connector will be for such repairs, this is by no means the only use of the device. The internally threaded connector may also serve as an attachment for a decorative device having a male threaded attachment extension thereon, e.g., carburetor air cleaner attachments for vehicles using relatively large or tall air cleaner housings, etc. The connectors are also quite useful in connecting rod ends together to connect lengths of cable having threaded rod ends swaged thereon, etc.

It will be recognized that a number of the internally threaded connectors may be provided as a kit, along with a series of compatible threaded studs for use therewith. The internally threaded connector components in such a kit may be identically configured to one another, or may include at least one (or more) units which are configured differently from the others, e.g., different lengths, diameters, thread diameters and pitches, wrench flat spans and locations along the device, etc. The external or male threaded components of such a kit would be configured so that the components are compatible with the internally threaded connectors of the kit. Accordingly, the internally threaded connector in its various embodiments will prove to be a most useful device for mechanics and others who wish to save time and effort on the job.

It is to be understood that the present invention is not limited to the embodiment(s) described above, but encompasses any and all embodiments within the scope of the following claims.

The invention claimed is:

1. An internally threaded connector, comprising:
a generally tubular cylindrical sleeve having a first end and a second end opposite the first end, the first end and second end defining a length therebetween, the sleeve being internally threaded along at least a portion of the length thereof, the sleeve defining a thin wall, the first end and the second end of the sleeve each having a bearing surface flat thereon, wherein said sleeve includes a first internally threaded portion adjacent the first end thereof, a second internally threaded portion substantially medially disposed within said sleeve, the second internally threaded portion having a smaller internal diameter than the first internally threaded portion, and a smooth, unthreaded portion adjacent the second end of said sleeve, the unthreaded portion having a larger internal diameter than the first internally threaded portion; and
a plurality of wrench flats disposed in a polygonal circumferential array about a minor portion of the sleeve.

2. The internally threaded connector according to claim 1, wherein said circumferential array of wrench flats defines a minor diameter across opposed flats, the minor diameter defining a bearing surface land between the minor diameter and the external surface of said sleeve, the bearing surface land having an outer edge defined by the minor diameter of said circumferential array of wrench flats and an inner edge defined by the external surface of said sleeve, the outer edge and the inner edge of the bearing surface land defining a width therebetween, the width being up to the thickness of the thin wall of said sleeve.

3. The internally threaded connector according to claim 1, wherein said plurality of wrench flats are disposed adjacent one end of said sleeve.

4. The internally threaded connector according to claim 1, wherein the threads of said internally threaded sleeve have a constant diameter and thread pitch.

5. The internally threaded connector according to claim 1, further comprising a threaded replacement stud threaded into a portion of said sleeve, said sleeve being adapted for threading onto a broken stud, whereby the broken stud may be replaced without removal of the broken stud.

6. A kit for extending an externally threaded fastener, comprising:

at least one internally threaded connector including:

a generally tubular cylindrical sleeve having a first end and a second end opposite the first end, the first end and second end defining a length therebetween, the sleeve being internally threaded along at least a portion of the length thereof, the sleeve defining a thin wall, the first end and the second end of the sleeve each having a bearing surface flat thereon, wherein said sleeve includes a first internally threaded portion adjacent the first end thereof, a second internally threaded portion substantially medially disposed within said sleeve, the second internally threaded portion having a smaller internal diameter than the first internally threaded portion, and a smooth, unthreaded portion adjacent the second end of said sleeve, the unthreaded portion having a larger internal diameter than the first internally threaded portion; and a plurality of wrench flats disposed in a polygonal circumferential array about a minor portion of the sleeve; and at least one externally threaded fastener removably installed within one end of said sleeve.

7. The kit according to claim 6, wherein said circumferential array of wrench flats defines a minor diameter across opposed flats, the minor diameter defining a bearing surface land between the minor diameter and the external surface of said sleeve, the bearing surface land having an outer edge defined by the minor diameter of said circumferential array of wrench flats and an inner edge defined by the external surface of said sleeve, the outer edge and the inner edge of the bearing surface land defining a width therebetween, the width being up to the thickness of the thin wall of said sleeve.

8. The kit according to claim 6, wherein said plurality of wrench flats are disposed adjacent one end of said sleeve.

9. The kit according to claim 6, wherein the threads of said internally threaded sleeve have a constant diameter and thread pitch.

10. The kit according to claim 6, wherein said at least one internally threaded connector comprises a plurality of internally threaded connectors, at least two of said connectors having at least one mutually different dimensional characteristic, said at least one fastener comprising a plurality of externally threaded fasteners removably installed within said sleeves.

* * * * *